United States Patent [19]

Horiuchi et al.

[11] Patent Number: 4,750,329
[45] Date of Patent: Jun. 14, 1988

[54] HYDRAULIC PRESSURE SOURCE DEVICE FOR HYDRAULIC BOOSTERS

[75] Inventors: Makoto Horiuchi, Maruko; Yoshitaka Miyagawa, Wako, both of Japan

[73] Assignees: Nissin Kogyo Kabushiki Kaisha, Ueda; Honda Giken Kogyo Kabushiki Kaisha, Tokyo, both of Japan

[21] Appl. No.: 945,616

[22] Filed: Dec. 23, 1986

[30] Foreign Application Priority Data

Dec. 28, 1985 [JP] Japan .............................. 60-299173

[51] Int. Cl.$^4$ ............................................ B60T 13/10
[52] U.S. Cl. .................................. 60/547.1; 303/114; 303/9.62
[58] Field of Search ............... 60/547.1; 303/6 C, 114

[56] References Cited

U.S. PATENT DOCUMENTS 4,641,894 2/1987 Belart .............................. 303/114 X
4,669,788 6/1987 Farr ..................................... 303/6 C Primary Examiner—Alan Cohan
Attorney, Agent, or Firm—Armstrong, Nikaido, Marmelstein & Kubovcik

[57] ABSTRACT

A hydraulic pressure source device for hydraulic boosters, comprising a hydraulic pump connected via a high-pressure oil passage to an input port of a hydraulic booster and a proportional reducing valve serving as a regulator interposed in the high-pressure oil passage, wherein the proportional reducing valve acts to reduce the pressure above a set level fed from the pump at certain reduction ratio and transmit it to the booster, the valve having a piston which is retractable beyond a valve-closing position to enlarge the volume of an output hydraulic chamber of the valve. Such retracting motion of the valve piston attenuates any impact which may be caused by kickback phenomenon occurring during operation of the booster.

5 Claims, 1 Drawing Sheet

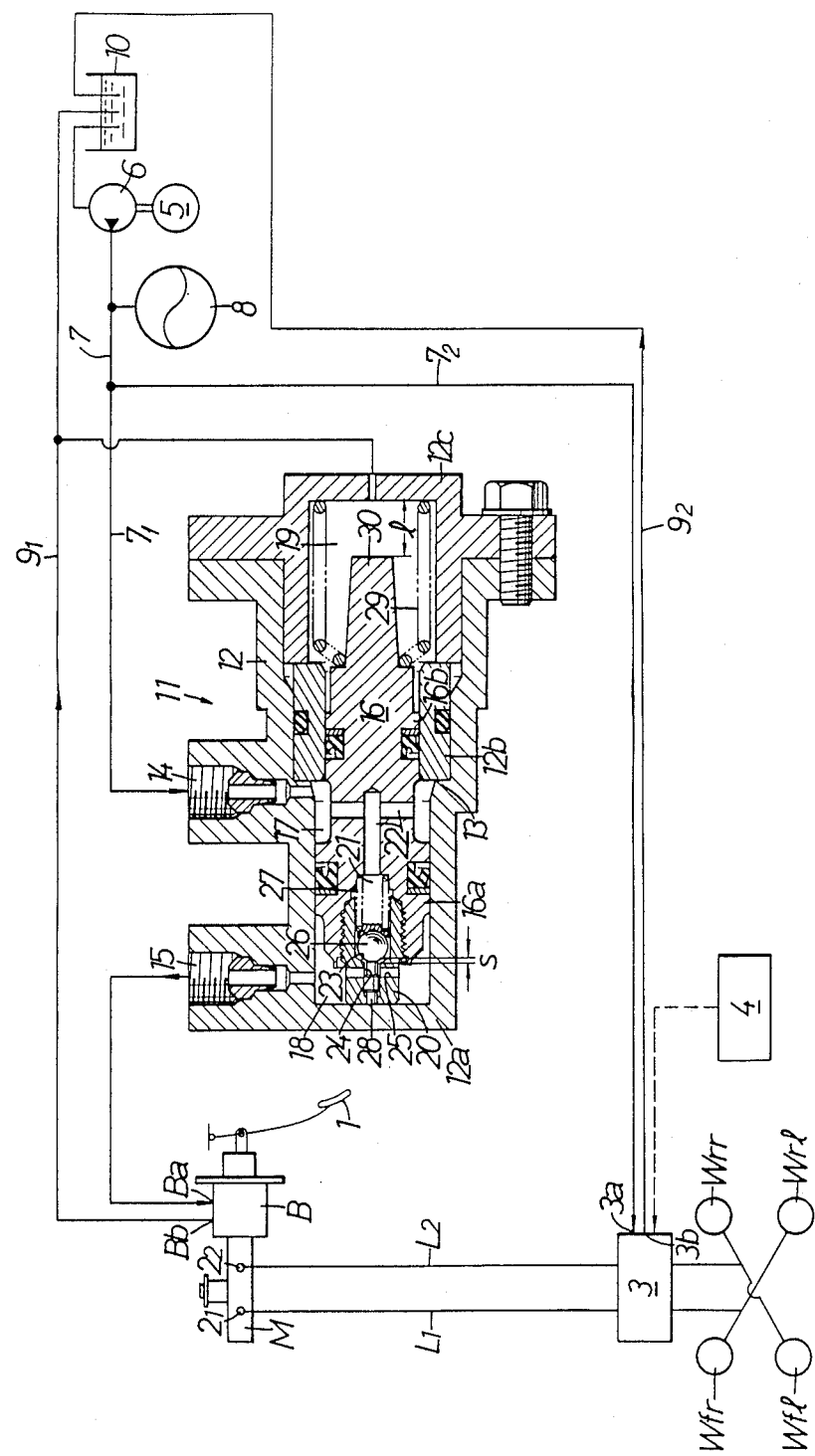

HYDRAULIC PRESSURE SOURCE DEVICE FOR HYDRAULIC BOOSTERS

BACKGROUND OF THE INVENTION

1. Field of the Invention

This invention relates to a hydraulic pressure source device for hydraulic boosters, and more particularly to an improvement in a hydraulic pressure source device for hydraulic boosters, in which a regulator adapted to regulate a pressure discharged from a hydraulic pump and transmit the regulated pressure to a hydraulic booster is provided in a high-pressure oil passage which connects an input port of the hydraulic booster and an output port of the hydraulic pump.

2. Description of the Prior Art

In conventional hydraulic pressure source device of this kind, a one-way valve which is adapted to be opened when a discharge pressure from a hydraulic pump has reached a level not lower than a predetermined level is used as a regulator. Accordingly, when a kickback phenomenon occurs during operation of a hydraulic booster, i.e., when a booster piston in the hydraulic booster is pushed back from the side of a load, the input hydraulic pressure into the hydraulic booster increases, so that the one way valve provided as a regulator is closed to hydraulically lock the booster piston. Therefore, the impact occurring due to the kickback phenomenon cannot be released. In order to release the impact occurring due to a kickback phenomenon, it has been known to take such measure that an accumulator capable of lessening an increase in the pressure in a high-pressure oil passage extending between the regulator and hydraulic booster is connected to the same oil passage.

In a hydraulic pressure source device of this kind, it is general that an accumulator which is used only for accumulating pressure is connected to a high-pressure oil passage extending between a hydraulic pump and a regulator. Therefore, if another accumulator is connected as mentioned above to a high-pressure oil passage which extends between the regulator and hydraulic booster, the number of comparatively expensive accumulators in use increases, so that the manufacturing cost of a hydraulic pressure source device inevitably increases to a considerable extent.

SUMMARY OF THE INVENTION

The present invention has been developed in view of these facts. It is an object of the present invention to provide an inexpensive hydraulic pressure source device which includes a regulator adapted to absorb by itself impacts occurring due to a kickback phenomenon, thereby to allow an accumulator, which is conventionally provided between the regulator and hydraulic booster, to be eliminated from the device.

In order to achieve this object, the present invention provides a hydraulic pressure source device characterized in that a regulator is formed of a proportional reducing valve which is adapted to reduce a discharge pressure from a hydraulic pump at a predetermined pressure reduction ratio and transmit the resultant reduced pressure to a hydraulic booster, and that a piston in the reducing valve is given a reverse stroke of such extent that the piston can be moved back beyond a valve-closing position so as to increase the volume of an output hydraulic chamber in the same valve.

Normally, a discharge pressure from a hydraulic pump is reduced at a predetermined pressure reduction ratio by a proportional reducing valve which constitutes a regulator, and the resultant pressure is applied to the input port of a hydraulic booster.

If a kickback phenomenon occurs during operation of the hydraulic booster, an input hydraulic pressure into the hydraulic booster, i.e. an output hydraulic pressure from the reducing valve increases, so that the piston in this valve is moved back beyond a valve-closing position to lessen the increase in the hydraulic pressure inputted into the hydraulic booster.

The above and other objects as well as advantageous features of the invention will become apparent from the following description of the preferred embodiment taken in conjunction with the accompanying drawing.

BRIEF DESCRIPTION OF THE DRAWING

The accompanying drawing is a schematic longitudinal section of a principal portion of an antilock brake system for automobiles, which is provided with an embodiment of the hydraulic pressure source device according to the present invention.

DESCRIPTION OF THE PREFERRED EMBODIMENT

An embodiment of the present invention applied to an antilock brake system for automobiles will now be described with reference to the drawing. A hydraulic booster B, which is adapted to actuate a brake master cylinder M for an automobile with magnified power, is connected to an operating section of the master cylinder M. This booster B is operated by a brake pedal 1.

The brake master cylinder M has a tandem type construction having two independent output ports $2_1$, $2_2$. The first output port $2_1$ is connected to a right front wheel brake Wfr and a left rear wheel brake Wrl via a first braking oil passage $L_1$, and the second output port $2_2$ to a left front wheel brake Wfl and a right rear wheel brake Wrr via a second braking oil passage $L_2$. Accordingly, the right front wheel brake Wfr and left rear wheel brake Wrl are operated by an output hydraulic pressure from the first output port $2_1$, and the left front wheel brake Wfl and right rear wheel brake Wrr by an output hydraulic pressure from the second output port $2_2$.

A modulator 3 is provided on the half ways of the first and second braking oil passages $L_1$, $L_2$. The modulator 3 is adapted to reduce, when it receives an attenuating signal from an antilock control unit 4, the hydraulic braking pressure for the brakes connected to the first braking oil passage $L_1$ or second braking oil passage $L_2$. The antilock control unit 4 is adapted to detect a slip rate of each wheel of the automobile and output, when the slip rate has exceeded a predetermined level, an attenuating signal to the modulator 3.

A high-pressure oil passage 7, which extends from a discharge port of a hydraulic pump 6 driven by an electric motor 5, branches midway into two branch passages $7_1$ and $7_2$ which are connected to the input ports Ba and 3a of the hydraulic booster B and modulator 3, respectively. Accumulator 8 is connected to an intermediate portion of this high-pressure oil passage 7 upstream of the branch passages 7 and $7_2$. Exhaust ports Bb and 3b of the hydraulic booster B and modulator 3 are communicated with an oil reservoir 10 via exhaust oil passages $9_1$, and $9_2$ respectively.

A proportional reducing valve 11 serving as a regulator is inserted in one branch passage 7, of the high-pressure oil passage 7 which connects the hydraulic pump 6 and hydraulic booster B together.

A housing 12 of the proportional valve 11 comprises a stepped cylindrical housing body 12a closed at one end thereof and opened at the other end, a support cylinder 12b fitted oil-tightly in an intermediate portion of the interior of the housing body 12a, and a cover member 12c holding the support cylinder 12b in place in its axial direction in cooperation with an intermediate stepped portion 13 of the housing body 12a and closing the opened end of the housing body 12a. The housing body 12a is provided on one side portion of the circumferential wall thereof with an inlet port 14 communicated with the hydraulic pump 6, and an outlet port 15 communicated with the hydraulic booster B. The inner diameter of the portion of the housing 12a which is between these two axially distanced ports 14, 15 is set larger than that of the support cylinder 12b.

The housing 12 receives a piston 16 therein. This piston 16 has a larger-diameter portion 16a which is fitted oil-tightly and slidably in the portion of the housing body 12a which is between the two ports 14, 15, and a smaller-diameter portion 16b which is fitted oil-tightly and slidably in the support cylinder 12b. These portions 16a, 16b of the piston 16 divide the interior of the housing 12 into three chambers, i.e. an input hydraulic chamber 17 communicated with the inlet port 14, an output hydraulic chamber 18 communicated with the outlet port 15, and a spring chamber 19.

A valve cylinder 20 is screw-connected to the front end of the piston 16 which faces the interior of the output hydraulic chamber 18. A valve chamber 21 defined in the valve cylinder 20 is communicated at one end thereof with the input hydraulic chamber 17 via a through bore 22 in the piston 16, and at a valve seat 23 at the other end thereof with the output hydraulic chamber 18 as well via a valve port 24 and a lateral bore 25 formed in the valve cylinder 20. This valve chamber 21 houses therein a spherical valve body 26, and a valve spring 27 urging the valve body 26 in a direction to seat on the valve seat 23.

A valve-opening rod 28 is inserted in the valve port 24. This valve-opening rod 28 is opposed at one end thereof to the inner end surface of the output hydraulic chamber 18 and at the other end thereof to the valve body 26, and is adapted to disengage the valve body 26 from the valve seat 23 when the piston 16 has reached a limit of its forward movement (a limit of its leftward movement in the drawing), and permit the valve body 26 to seat on the valve seat 23 when the piston 16 has moved from the limit of its forward movement in the backward (rightward in the drawing) direction by a distance of not less than s.

In the spring chamber 19 is compressed a pressure-regulating spring 29 which resiliently urges the piston 16 in the forward direction, i.e., toward the output hydraulic chamber 18.

A reverse stroke l of the piston 16 is limited by a projecting shaft 30 at the rear end thereof coming into abutment against the cover member 12c. This stroke l is set sufficiently larger than the quantity of backward movement s, which is required for a valve-closing operation of the valve body 26, of the piston 16.

The operation of this embodiment will now be described. When a hydraulic pressure is supplied from the hydraulic pump 6 to the input hydraulic chamber 17 through the inlet port 14, the pressure is transmitted, in a stage where the level of the hydraulic pressure is lower than a predetermined level, to the output hydraulic chamber 18 through the through bore 22, valve chamber 21, valve port 24 and lateral bore 25 without being reduced in level.

When the hydraulic pressure in the input and output hydraulic chambers 17, 18 has increased to a predetermined level, the retracting force acting on the piston 16, which is determined by multiplying the cross-sectional area of the smaller-diameter portion 16b of the piston 16 by this hydraulic pressure, overcomes a setting load of the regulating spring 29, so that the piston 16 moves back as it compresses the regulating spring 29. When the quantity of the backward movement of the piston 16 has reached s, the valve body 26 seats on the valve seat 23 to close the valve port 24. Therefore, during this time, any increase in the hydraulic pressure in the output hydraulic chamber 18 does not occur.

When the hydraulic pressure in the input hydraulic chamber 17 has further increased and the sum of the advancing force acting on the piston 16 due to the hydraulic pressure in the input hydraulic chamber 17 and the advancing force on the piston 16 due to the pressure-regulating spring 29 has overcome the retracting force posed on the piston 16 due to the hydraulic pressure in the output hydraulic chamber 18, the piston 16 moves forward (leftward in the drawing). When the piston has reached the limit of its forward movement, the valve body 26 is disengaged from the valve seat 23 by the valve-opening rod 28, so that the valve port 24 is opened again. As a result, the hydraulic pressure in the input hydraulic chamber 17 is transmitted to the output hydraulic chamber 18 to increase the hydraulic pressure therein. When this pressure has reached a certain level, the piston 16 moves back again, and the valve port 24 is closed by the valve body 26 to stop the increase in this pressure. Owing to the repetition of these operations, the pressure which is not less than a predetermined level is reduced at a predetermined pressure reducing ratio, and the resultant pressure is transmitted to the output hydraulic chamber 18. The hydraulic pressure fed to the output hydraulic chamber 18 is applied to the input port Ba of the hydraulic booster B for use with operation of the booster B.

If the brake pedal 1 is now depressed to brake the vehicle, the hydraulic booster B is actuated depending on the hydraulic pressure at its input port Ba, to drive the brake master cylinder M. Consequently, the front and rear wheel brakes Wfr, Wrl, Wfl, Wrr are operated by the output hydraulic pressure generated at the first and second output ports $2_1$, $2_2$.

If the modulator 3 is operated by an attenuating signal outputted from the antilock control unit 4 during such braking operation, so as to avoid locking of the wheels, the output hydraulic pressure at the output ports $2_1$, $2_2$ is pushed back to the side of the brake master cylinder M so as to reduce the hydraulic braking pressure for the front and rear wheel brakes Wfr, Wrl; Wfl, Wrr. In consequence, in the hydraulic booster B, a kickback phenomenon occurs to push back the booster piston from the side of brake master cylinder M. This causes the pressure oil at the input port Ba to flow back to the output hydraulic chamber 18 of the reducing valve 11, so that the pressure in the chamber 18 increases to move the piston 16 back.

Since the reverse stroke l of the piston 16 is set sufficiently larger than the quantity s of its backward movement which is required for the valveclosing operation of the valve body 26, the piston 16 moves back greatly while compressing the pressure regulating spring 29, to enable an increase in the hydraulic pressure in the output hydraulic chamber 18, i.e. an increase in the input hydraulic pressure to the hydraulic booster B to be lessened, whereby the modulator 3 is assured its normal operation.

When the depressing force is released from the brake pedal 1 to release the wheel braking, the pressure oil which has been used to operate the hydraulic booster B up to that time is returned from the exhaust port Bb to the oil reservoir 10.

According to the present invention described above, the regulator is formed of a proportional reducing valve which is adapted to reduce a pressure discharged from the hydraulic pump at a predetermined reducing ratio and transmit thus reduced pressure to the hydraulic booster, and a piston in this valve is mounted to slide a reverse stroke of such amount that allows the piston to move back past the valve-closing position so as to increase the volume of the output hydraulic chamber of the valve. Accordingly, when a kickback phenomenon occurs during operation of the hydraulic booster, the piston in the reducing valve, which constitutes a regulator, moves back beyond the valve-closing position to decrease impacts which may occur due to the kickback phenomenon. Therefore, an accumulator need not be provided in the portion of the high-pressure oil passage which extends between the regulator and hydraulic booster. Owing to the simplified construction, the hydraulic pressure source device can be provided at low price.

What is claimed is:

1. A hydraulic pressure source device for hydraulic boosters, comprising a hydraulic pump, a high-pressure oil passage having a portion which connects a discharge port of the pump and an input port of a hydraulic booster, and a regulator for regulating a pressure discharged from the pump and transmitting thus regulated pressure to the hydraulic booster,
   wherein said regulator is formed as a proportional reducing valve capable of reducing the discharged pressure from the pump at a predetermined reduction ratio and transmitting a reduced pressure to the booster, said valve having a piston which is movable in a retracting direction by a stroke of such amount that permits the piston to retract past a valve closing position to enlarge a volume of an output hydraulic chamber.

2. A hydraulic pressure source device defined in claim 1, wherein a modulator is interposed in a braking oil passage connecting a master cylinder actuated by the booster and a wheel brake for reducing a braking pressure fed to the brake when a wheel is about to be locked, said modulator having an input port connected to said hydraulic pump via said high-pressure oil passage.

3. A hydraulic pressure source device defined in claim 1 or 2, wherein an accumulator is interposed in the high-pressure oil passage upstream of the proportional reducing valve.

4. A hydraulic pressure source device defined in claim 2, wherein said high-pressure oil passage branches midway thereof into two branch passages of which one leads to the booster and the other leads to the modulator, said regulator being interposed in said one branch passage.

5. A hydraulic pressure source device defined in claim 1, wherein a modulator is interposed in a braking oil passage connecting a master cylinder actuated by the booster and a wheel brake for reducing a braking pressure fed to the brake when a wheel is about to be locked, said output hydraulic chamber of the valve being enlarged in volume when a pressure at said input port of the booster increases in response to a braking pressure reducing operation of the modulator.

* * * * *